United States Patent [19]
Allen

[11] 3,801,927
[45] Apr. 2, 1974

[54] LASER AND METHOD OF OPERATION
[75] Inventor: Richard A. Allen, Watertown, Mass.
[73] Assignee: Avco Corporation, Cincinnati, Ohio
[22] Filed: May 24, 1967
[21] Appl. No.: 643,296

[52] U.S. Cl.................................. 331/94.5, 330/4.3
[51] Int. Cl............................................. H01s 3/02
[58] Field of Search................... 331/94.5; 330/4.3; 219/121

[56] References Cited
UNITED STATES PATENTS
2,851,652   9/1950   Dicke.......................... 331/94.5 UX
3,292,102  12/1966   Byrne................................ 331/94.5
3,302,127   1/1967   Lin................................. 330/4.3 X OTHER PUBLICATIONS
Hurle et al., "Electronic Population Inversions by Fluid-Mechanical Techniques," The Physics of Fluids, Vol. 8, No. 9, Sept. 1965, pp. 1601–1606.

Primary Examiner—Maynard R. Wilbur
Assistant Examiner—N. Moskowitz
Attorney, Agent, or Firm—Charles M. Hogan; Melvin E. Frederick

[57]  ABSTRACT

A laser and method of operating same wherein an optical resonator which receives a gas from supersonic nozzle includes a fully reflective mirror and an oppositely disposed mirror partially transmissive by reason of hole coupling. The partially transmissive mirror does not include a permanently mounted transmitting window during operation. During startup, the holes are covered by a shutter or the like and after the laser has been started aerodynamically, the holes are uncovered.

4 Claims, 1 Drawing Figure

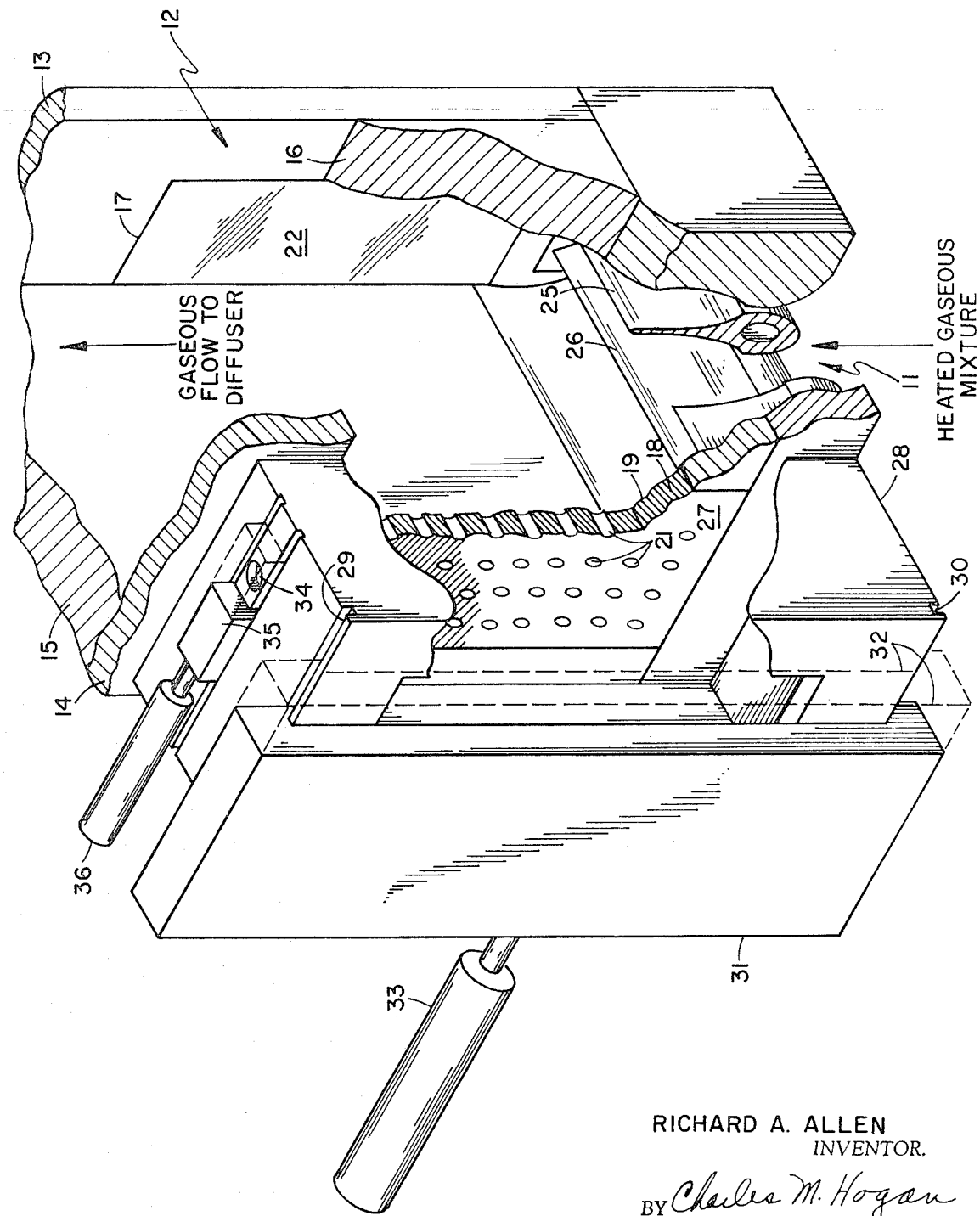
RICHARD A. ALLEN
INVENTOR.
BY Charles M. Hogan
Melvin E. Frederick
ATTORNEYS

LASER AND METHOD OF OPERATION

Optical masers or lasers, as the art has developed, generally involve the establishment of an artificial distribution of bound electrons at energy levels other than the natural distribution in a host environment through the application of a source of energy known as the "pumping energy." This results in a greater number of molecules or atoms in some high energy level than in a lower energy level to which it is optically connected. This is known as a population inversion. The electrons present in the host environment in the artificial distribution then give up their energy and undergo a transition to the lower energy level. The released energy may be in the form of electromagnetic radiation; which, in the majority of devices seen thus far in the art, has been light, either in the visible or infrared.

In laser devices currently available in the art, there may be employed a gas, such as a helium-neon mixture; or a crystal, such as chromium doped aluminum oxide; or a noncrystalline solid, such as neodymium glass; or a liquid, such as trivalent neodymium in selenium oxychloride, as the environment which responds to the pumping energy, permitting the population inversion of electrons between an excited state and a lower state. The electrons in returning to the lower state give off quanta of light energy or photons in what is known in the art as a radiative transition. When the density of these photons becomes large, the radiative transition probability increases; and, in the presence of a population inversion, electromagnetic modes into which the photons are emitted, in turn, become most readily able to induce further emission therein. This is known in the art as stimulated emission of radiation and results in a narrowing of the emission line. In the currently available laser devices, electrical power is converted to optical power, pumping light or an electrical discharge or electric current; which, in turn, is used to establish the population inversion. All known prior art lasers are of relatively low power. A high power laser has been a long sought need for a large number of potential applications, both military and commercial, and numerous attempts have been made to provide a truly high power laser. The gas laser is the general category into which most of these efforts have fitted.

In the Polanyi references identified hereinafter, it is suggested that total and partial inversions may be obtained as a direct result of chemical reaction. Without flow, such inversions are transient. Even if the gas is pulsed thermally and permitted to relax differentially, such disclosed devices are inherently low density devices since the translational and rotational energy is removed by diffusion to the walls. The Hurle et al paper also identified hereinafter suggests a gas dynamic laser utilizing supersonic expansion as a method of producing population inversion between electronic states by differential radiation relaxation. While presumably in theory (Hurle et al. admit that they were unable to observe an inversion) an inverted population can be produced in this fashion, the size of a gas dynamic laser based solely on this principle is limited because of radiative trapping and also the stagnation temperatures required to have a significant fraction of the energy in the desired electronic level at equilibrium are quite high. For the purpose of convenience, a laser, the principle of operation of which is based on supersonic expansion as a method of producing population inversion, is referred to as a gas dynamic laser.

The following references and materials cited therein describe some of the background and physical principles involved in the gas dynamic laser under discussion and an insight, to some degree, of application of those principles in the present state of the art:

1. "Infrared and Optical Masers," by A. L. Shawlow and C. H. Townes in Physical Review, Vol. 112, No. 6, Dec. 15, 1958, pp 1940–1949.
2. "Attainment of Negative Temperatures by Heating and Cooling of a System" by N. G. Basov and A. N. Oraevskii, Soviet Physics, JETP, Vol. 17, No. 5, November 1963, pp 1171–1172.
3. "Population Inversion in Adiabatic Expansion of a Gas Mixture" by V. K. Konyukhov and A. M. Prokhorov, JETP Letters, Vol. 3, No. 11, June 1, 1966, pp 286–288.
4. "Electronic Population Inversions by Fluid-Mechanical Techniques" by I. R. Hurle and A. Hertzberg, The Physics of Fluids, Vol. 8, No. 9, Sept. 1965, pp 1601–1607.
5. Polanyi, J.C., J. Chem. Phys. 34 347 (1961).
6. Polyanyi, J.C., Applied Optics Supplement No. 2 on Chemical Lasers, 109 (1965).

Broadly, operative gas dynamic lasers of the type here concerned comprise a gas containing chamber having an exhaust outlet; means for heating a polyatomic gas to provide equilibrium vibrational excitation in said gas, the polyatomic gas having an upper laser level, lower laser level and a ground state, the upper laser level having an effective relaxation time that is long compared to the effective relaxation time of the lower laser level; nozzle means for expanding the heated gas into the chamber into a stream to provide a flow time in the nozzle means that is short compared to the effective relaxation time of said upper laser level and long compared to the effective relaxation time of said lower laser level; and an optical resonator coupled to said stream of gas. For a more thorough and detailed discussion of operative gas dynamic lasers, reference is made to patent application Ser. No. 626,357, filed Feb. 16, 1967, entitled "High Powered Laser" and assigned to the same Assignee as this application.

In accordance with the present invention, there is provided in a gas dynamic laser a transmissive mirror having a passage or passages for coupling power out of the optical resonator, the working medium within the optical resonator being in direct communication with the environment surrounding the laser via the transmissive mirror. In use, the passages in the transmissive mirror may be sealed as by a shutter or the like to prevent leakage into the optical resonator during startup. After startup, the aforementioned seal is removed.

It is a principal object of the invention to provide an improved gas dynamic laser and method of operation.

It is a further object of the invention to provide a laser which does not require a sealed optical system.

A further object of the invention is to reduce loss in the optical system of a gas dynamic laser.

A still further object is a provision of an improved method of operating gas dynamic lasers.

Another object is to provide an improved gas dynamic laser having windowless output optics and a method of operation which permits simple and efficient aerodynamic starting of the laser.

The novel features that are considered characteristic of the invention are set forth in the appended claims; the invention itself, however, both as to its organization and method of operation, together with additional objects and advantages thereof, will best be understood from the description of a specific embodiment when read in conjunction with the accompanying drawing which is a pictorial view with parts broken away illustrating an improved laser in accordance with the invention.

Referring now to the drawing, there is shown by way of illustration a portion of a gas dynamic laser for receiving from a high temperature gas source (not shown), such as for example a combustor or burner, a gas mixture in substantially complete equilibrium and comprised of, for example, about 89 mole percent $N_2/CO$, about 10 mole percent $CO_2$, and about 1 mole percent $H_2O$ at a stagnation temperature of about 1100°C and a pressure of about 17 atmospheres. A suitable fuel, such as cyanogen, and a mixture of oxygen, nitrogen and hydrogen may be supplied to a burner and burned to provide the aforementioned gaseous mixture. The equilibrium gaseous mixture may be exhausted from a burner via a supersonic nozzle generally designated by the numeral 11, and supplied to a chamber 12 disposed downstream of the supersonic nozzle 11. The supersonic nozzle 11 accelerates the aforementioned gaseous mixture to provide in the chamber 12 a velocity of about Mach 4, a pressure of about 0.1 atmospheres, and a temperature of about 300–500°C, whereby there is provided in the chamber 12 a population inversion. The chamber defined by walls 13, 14, 15 and 16 may be slightly divergent in the direction of flow to provide substantially constant gas velocities, pressure and temperatures. After passing through the chamber 12, the gaseous mixture may be supplied to a diffuser (not shown) and for an open cycle system, thereafter exhausted to the atmosphere. Conventional means are of course provided for controlling the supply of fuel and/or combustion supporting medium to the burner whereby the composition of fuel in the burner provides a polyatomic gas and an auxiliary gas or gases at the required temperature or pressure.

A fully reflective mirror 17 and an oppositely disposed partially reflective mirror 18 carried by respectively walls 13 and 14 of chamber 12 provide in conventional manner an optical cavity or resonator downstream of the supersonic nozzle. Because of, inter alia, high heat flux which may be encountered on the mirrors 17 and 18, conventional mirrors, such as dielectric coated Irtran and salt mirrors, have been found unsatisfactory for use in gas dynamic lasers, whereas mirrors formed of copper and provided with hole coupling have operated satisfactorily.

For high temperature and/or long duration devices, the combustor, nozzle, chamber, diffuser, mirrors and the like must of course be cooled because of the heat fluxes to which they are of necessity exposed. Conventional cooling techniques may be employed to maintain the various components at safe operating temperatures. In addition to usual heat fluxes encountered in combustion driven aerodynamic devices of this type, i.e., gas dynamic lasers, the heat flux on the mirrors due to laser action imposes an added heat load on the mirrors. This laser heat flux can be adjusted to a suitably low level by those versed in the art as, for example, by flowing cool nitrogen over the mirrors to bring them to a temperature level comparable to the usual heating encountered in such devices. Accordingly, conventional means of cooling have not been shown for purposes of clarity and the discussion thereof is not deemed necessary.

The mirror metal preferably is as pure as possible and dead soft. In the case of copper, 99.999% purity and annealing to make it dead soft is recommended.

Metal mirror 18 is provided with hole coupling for coupling light energy out of chamber 12. Mirror 18 may be formed of 99.999% pure, dead soft copper. The active or inner surface 19 is optically polished such that the wavelength of the radiation striking it is greater than the wavelength corresponding to the state of surface 19. Passages 21 normal to surface 19 are provided in mirror 18 and extend through the mirror to provide coupling out of the chamber 12. The total area of the passages 21 is selected to provide the necessary percent of transmission. The passages 21 may, for example, be arranged and adapted to provide an equilateral array. The fully reflective mirror 17 is oppositely disposed to mirror 18 and with the exception of the shape of its active surface 22 and the absence of passages is identical to the partially transmissive mirror 18. The active surface 19 of the partially transmissive mirror 18 is preferably substantially optically flat, whereas the fully reflective mirror 17 is provided with an active surface shape most conducive to maximum reflection between the mirrors.

The supersonic nozzle 11 may, for example, comprise an elongated multi-(in this case 3) throat nozzle comprising two vanes 25 and 26 arranged and adapted to provide a flow time in the nozzle that is short compared to the effective relaxation time of the upper laser level of the gas and long compared to the effective relaxation time of the lower laser level of the gas flowing therethrough. As previously mentioned, such a suitable flow time is about Mach 4. For a more complete discussion of suitable mirrors and nozzles, reference is made to the aforementioned patent application Serial No. 626,357 filed Feb. 16, 1967.

Directing attention now to the partially transmissive mirror 18, it will be noted that its surface 27 external to chamber 12, contrary to prior practice, is not sealably and permanently covered by a transmissive window to prevent the flow of fluid, such as for example air, into the chamber 12. Rectangular housing 28 open at both ends is sealably attached to the outer surface of chamber wall 14 and surrounds the passages 21 in mirror 18.

Carried by the distal end of housing 28 as by grooves 29 and 30 is a cover plate or shutter 31 having a closed position suggested by the broken lines 32 completely covering openings 21, preferably in an air-tight or nearly air-tight manner. Cover plate 31 is actuated to its fully opened (mirror 18 is completely uncovered or exposed to the environment surrounding the laser) and fully closed position by any suitable means such as piston 33. As previously mentioned, suitable conventional means (not shown) may be provided for cooling the cover plate 31 to prevent damage by the laser beam which impinges on it during startup and before it is actuated to its open position. Cover plate 31 may be of heat sink design if desired since it normally only covers and seals passages 21 for only a relatively short time during startup.

When the laser is started, which is to say the appropriate gas is supplied to nozzle 11 and passes through chamber 12 at supersonic velocities past mirrors 17 and 18, cover plate 31 is actuated to its closed position to prevent the flow or leakage of gas (normally air) into chamber 12 via passages 21. Once the necessary aerodynamic flow has been established in chamber 12, cover plate 31 is actuated to its open position and the laser will remain started. On starting, approximately an atmosphere of pressure is developed on the outside of cover plate 31 which tends to inhibit removal of the cover plate. This pressure difference can be conveniently relieved by providing a valve or large orifice in housing 28. Accordingly, housing 28 is provided with a passage 34, cover 35, and actuating means such as piston 36 to relieve the aforementioned pressure on cover plate 31 after the laser has been started. Cover 35 is of course actuated to cover passage 34 during startup.

As will now be evident, there has been described apparatus for and a method of operating a gas dynamic laser having reduced losses in its optics system. The invention is particularly advantageous for coupling out large powers such as approximately 1 KW/cm$^2$ and above. Heretofore, it was deemed necessary that transmitting windows in one form or another be used which rendered the mirrors air-tight. While starting of a supersonic nozzle having wall holes which are open to the surrounding environment can be achieved with the aid of starting tanks or by starting at higher than normal pressures, these methods are subject to the disadvantages of (1) requiring a completely sealed channel and thereby necessitating sealing transmitting optics for coupling power out, (2) cumbersome and expensive starting tanks, and (3) the difficulty of establishing sufficiently high pressures. The present invention as will now be apparent in addition to overcoming all of the aforementioned prior art difficulties provides a striking improvement in the design and operation of gas dynamic lasers.

While it has been shown what is at present considered to be the preferred embodiment of the invention, it will be understood by those skilled in the art that various changes and modifications may be made therein without departing from the proper scope of the invention as defined in the claims.

What is claimed is:

1. In a gas dynamic laser the combination comprising:
   a. means for providing a hot lasable gas;
   b. a chamber having an inlet and an exhaust;
   c. nozzle means coupled to said inlet for introducing said hot lasable gas into said chamber at supersonic velocity and less than atmospheric pressure, the flow of gas being through said chamber and out of said exhaust, the supersonic velocity of said gas in said chamber producing a population inversion in said gas in said chamber;
   d. mirror means defining an optically resonant cavity disposed in said chamber normal to the direction of gas flow through said chamber, said mirror means including a mirror having at least one passage in direct fluid communication with the environment exterior of said chamber, said mirror being composed of metal having a surface interior of said chamber substantially wholly reflective at a predetermined wavelength of light energy, and said passage being substantially normal to said surface for coupling light energy out of said chamber; and
   e. closure means for selectively opening and closing said passage to the flow of fluid therethrough.

2. The combination as defined in claim 1 wherein said closure means includes:
   a. a housing carried by an exterior surface of said chamber and surrounding said passage; and
   b. movable means associated with said housing for selectively preventing the flow of fluid through said passage.

3. The combination as defined in claim 2 wherein said movable means comprises a shutter having a closed position sealably covering said passage and an open position remote from said passage.

4. In the method of operating a gas dynamic laser having passages for coupling light energy out of said laser via a mirror forming part of an optically resonant cavity having a longitudinal axis, the steps comprising:

a. covering said passages to prevent the flow of gas therethrough;
   b. providing a hot lasable gas;
   c. while said passages are covered causing said hot lasable gas to flow through said optical cavity at supersonic velocity in a direction normal to and extending along the length of said optical longitudinal axis and produce stimulated emission in said cavity, any inflow of air through said passage and into said cavity being limited to flow substantially only in the boundary layer adjacent said mirror; and
   d. after said flow of hot gas has reached supersonic velocity in said cavity, uncovering said passages to provide direct fluid communication between said cavity and the environment exterior of said cavity and coupling said light energy out of said cavity.

* * * * *